(12) United States Patent
Egan et al.

(10) Patent No.: US 7,362,923 B2
(45) Date of Patent: Apr. 22, 2008

(54) SYSTEMS AND METHODS FOR MEASURING SIGNAL PHASE SHIFT CAUSED BY OPTICAL FIBERS

(75) Inventors: Jonathan D. Egan, Elkridge, MD (US); Anastasios P. Goutzoulis, Annapolis, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/499,704

(22) Filed: Aug. 7, 2006

(65) Prior Publication Data

US 2008/0031563 A1 Feb. 7, 2008

(51) Int. Cl.
*G02F 1/01* (2006.01)

(52) U.S. Cl. .......................................................... 385/1
(58) Field of Classification Search .................... 385/1, 385/3, 15, 27, 31, 47
See application file for complete search history.

(56) References Cited

U.S. PATENT DOCUMENTS

| 4,961,644 A | * | 10/1990 | Marsden ..................... 356/73.1 |
| 6,515,777 B1 | | 2/2003 | Arnold et al. |
| 6,671,434 B2 | * | 12/2003 | Copner et al. ................. 385/37 |
| 2002/0067524 A1 | | 6/2002 | Shinoda |
| 2002/0101636 A1 | | 8/2002 | Xiao et al. |
| 2002/0101637 A1 | | 8/2002 | Li |
| 2002/0122224 A1 | | 9/2002 | Rappaport et al. |
| 2002/0171889 A1 | | 11/2002 | Takeuchi et al. |
| 2002/0176133 A1 | | 11/2002 | Georges |
| 2003/0138250 A1 | | 7/2003 | Glynn |
| 2004/0052524 A1 | | 3/2004 | Arnold |
| 2005/0041969 A1 | | 2/2005 | Bisson et al. |
| 2005/0105901 A1 | | 5/2005 | Yavor et al. |
| 2005/0111843 A1 | | 5/2005 | Takeuchi et al. |

* cited by examiner

*Primary Examiner*—Sarah Song
(74) *Attorney, Agent, or Firm*—Rothwell, Figg, Ernst & Manbeck

(57) ABSTRACT

The present invention provides systems and methods for measuring signal phase shift caused by changes in fiber length.

18 Claims, 3 Drawing Sheets

SYSTEMS AND METHODS FOR MEASURING SIGNAL PHASE SHIFT CAUSED BY OPTICAL FIBERS

BACKGROUND OF THE INVENTION

1. Field of the Invention

The present invention relates to systems and methods for measuring signal phase shift caused by optical fibers.

2. Discussion of the Background

Photonic links (e.g., microwave photonic links) used for antenna remoting applications often operate in broad thermal environments. Optical fibers used in such photonic links may exhibit length changes due to temperature changes. These length changes may translate to phase changes of the remoted microwave signal. Depending on the type and length of the fiber, as well as the operating thermal range and actual RF frequency, the resulting signal phase variation may be quite severe. For most applications (e.g., beam forming applications or other applications), correction of these phase changes is desirable.

SUMMARY OF THE INVENTION

In a preferred embodiment, the present invention provides a phase measurement technique that employs a second optical wavelength. The technique allows for, but does not require, continually monitoring and measuring the length and phase of an optical fiber, thereby enabling dynamic phase measurement and correction.

A method according to one particular embodiment of the present invention includes: producing a monitoring signal; using the monitoring signal to modulate a light source, thereby producing modulated light that carries the monitoring signal; feeding the modulated light into an optical fiber, wherein the light, after entering the optical fiber, travels through the fiber a distance; after the modulated light travels the distance through the optical fiber, forcing the modulated light to travel back through the fiber towards the point at which the light entered the optical fiber; after forcing the modulated light to travel back through the optical fiber, receiving the modulated light and producing a phase-shifted monitoring signal based on the received modulated light; and processing the monitoring signal and the phase-shifted monitoring signal to produce a value corresponding to an amount of phase shift caused by the optical fiber.

A system according to one particular embodiment of the present invention includes: an optical multiplexer; a first light source coupled to a first input of the multiplexer; a second light source coupled to a second input of the multiplexer; an optical fiber having an input coupled to an output of the multiplexer for receiving light transmitted out the multiplexer output; and a reflector apparatus positioned and configured to receive the first light and the second light after the light travels through the optical fiber a distance, the reflector apparatus being configured to cause the first light to travel back through the optical fiber towards the point at which the first light entered the optical fiber and being configured to allow the second light to pass through.

A system according to another embodiment of the present invention includes: a first signal generator for producing a remoting signal; a second signal generator for producing a monitoring signal; a first light source coupled to the remoting signal generator for producing remoting light that carries the remoting signal; a second light source coupled to the monitoring signal generator for producing monitoring light that carries the monitoring signal; and an optical fiber for transmitting the remoting and monitoring light to a reflector apparatus, the reflector apparatus being configured to cause the monitoring light to travel back through the optical fiber towards the point at which the monitoring signal entered the optical fiber and being configured to allow the first light to travel to an optical detector.

The above and other features of embodiments of the present invention are described below with reference to the accompanying drawings.

BRIEF DESCRIPTION OF THE DRAWINGS

The accompanying drawings, which are incorporated herein and form part of the specification, help illustrate various embodiments of the present invention. In the drawings, like reference numbers indicate identical or functionally similar elements.

DETAILED DESCRIPTION OF PREFERRED EMBODIMENTS

Figure 1:
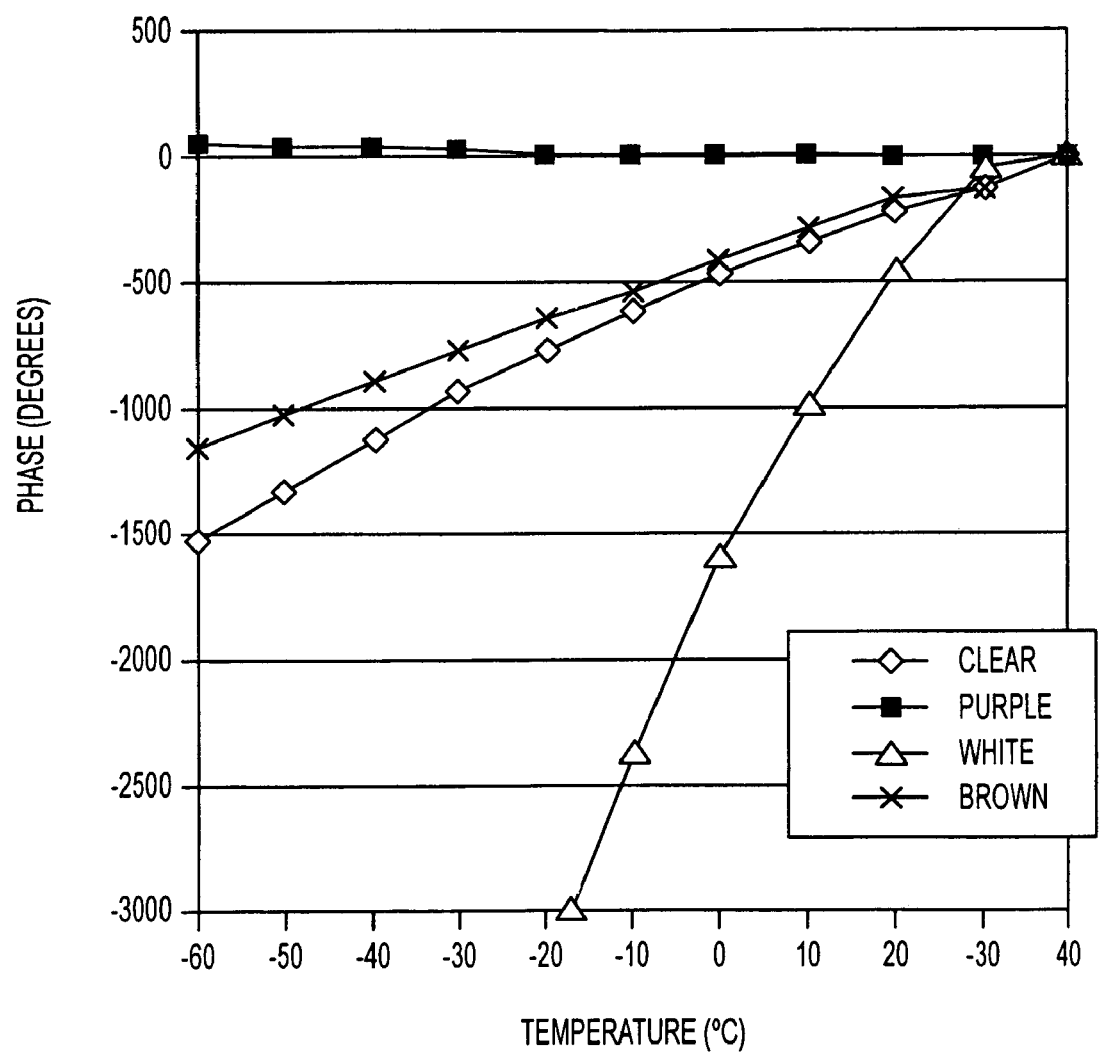
FIG. 1. shows test results of fiber phase variation vs temperature.

FIG. 1 shows test results of fiber phase variation vs temperature at 10 GHz, over the +40° C. to −60° C. thermal range, for various 100 meter long fibers. As FIG. 1 shows, the phase variation for standard fibers (brown, white, and clear) can be as high as 1,500 degrees or more. Custom phase-stable fiber (purple) has a much smaller phase variation, but such fiber is thicker (1.5 mm vs 0.25 mm for commercial off-the shelf (COTS) fiber) and is very expensive (~10 $/m vs 0.1 $/m for COTS fiber).

If the thermal environment is known in detail along the full length of the remoting fiber, then the variation in phase due to temperature changes could be corrected for by employing a look-up table approach. In some situations, however, this may be difficult, especially for physically long platforms (e.g., large space based antennas, large UAVs, distributed antennas, etc.). In these types of cases, a more practical solution involves the measurement of the fiber length/phase. As described below, embodiments of the invention enable the measurement of the fiber length/phase.

Figure 2:
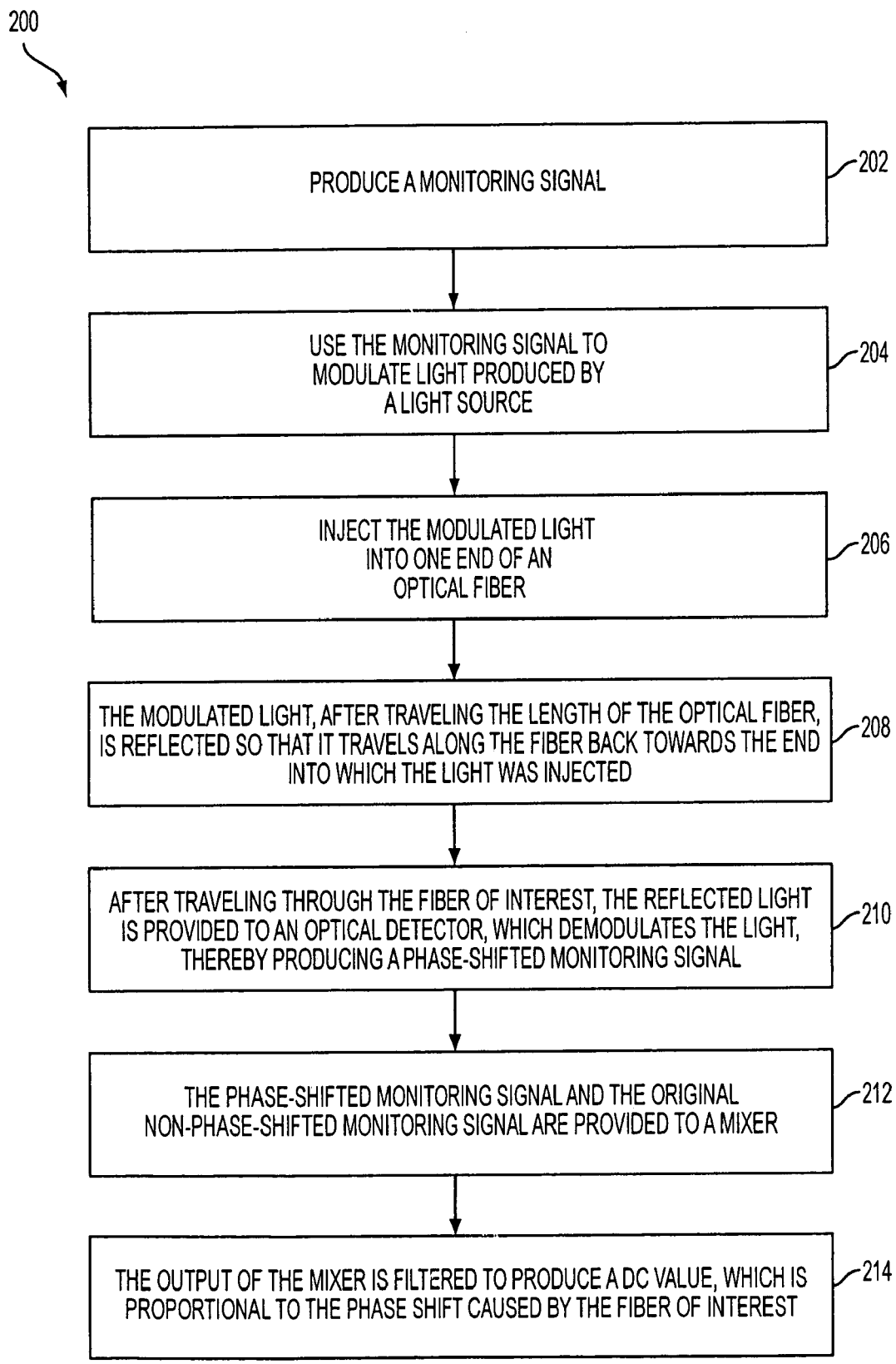
FIG. 2 is a flow chart illustrating a process according to an embodiment.

FIG. 2 is a flow chart illustrating a process 200 for measuring a signal's shift in phase due to the optical fiber along which the signal travels. Process 200 may start at step 202, where a monitoring signal ($f_{PH}$) is produced.

In step 204, the monitoring signal modulates light produced by a light source. Because the monitoring signal modulates the light, the modulated light produced by the light source "carries" the monitoring signal.

In step 206, the modulated light is injected into one end of an optical fiber.

In step 208, the modulated light, after traveling the length of the optical fiber, is reflected so that it travels along the fiber back towards the light source. In step 210, the reflected light, after traveling through the fiber of interest, is provided to an optical detector, which demodulates the light, thereby producing a phase-shifted monitoring signal.

In step 212, the phase-shifted monitoring signal and the original non-phase-shifted monitoring signal are provided to a mixer. In step 214, the output of the mixer is filtered to produce a DC value. The produced DC value is proportional to the phase shift caused by the fiber of interest. In this manner, the method enables one to measure the phase shift caused by changes in the fiber length.

Figure 3:
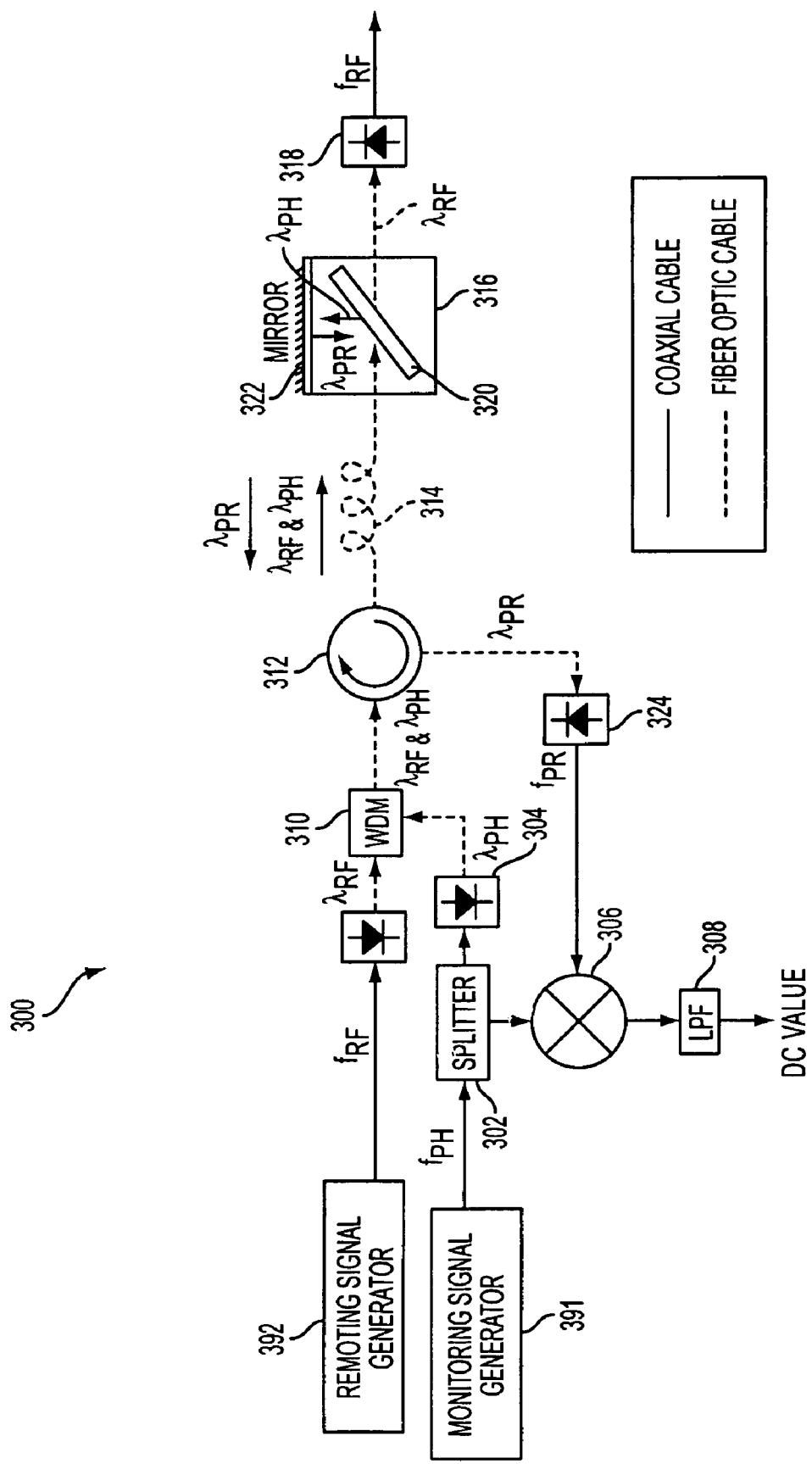
FIG. 3 is a schematic illustrating a system according to an embodiment.

FIG. 3 shows a schematic diagram of a system 300 according to an embodiment of the invention. As FIG. 3 shows, a second optical wavelength ($\lambda_{PH}$) is used to carry a monitoring RF signal, $f_{PH}$, which is used to measure the phase shift and which is generated by a monitoring signal generator 391. Note that the actual remoting signal $f_{RF}$, which is generated by a remoting signal generator 392 (e.g., an antenna, an antenna array driver, or other signal generator), is carried at wavelength $\lambda_{RF}$.

As further illustrated in FIG. 3, a splitter 302 may be used to split the monitoring signal into two channels, where one of the channels modulates a light source 304 (e.g., laser diode or other light source) at wavelength $\lambda_{PH}$, and the other channel drives a mixer 306. A multiplexer 310 (e.g., a standard wavelength division multiplexer (WDM)) may be used to multiplex the RF remoting optical carrier ($\lambda_{RF}$) with the phase monitoring optical carrier ($\lambda_{PH}$). The output of the WDM 310 is fed into a fiberoptic circulator 312, the output of which is connected to an input of a length of optical fiber 314. Thus, the combined wavelengths ($\lambda_{PH}$ and $\lambda_{RF}$) travel through fiber 314 towards a reflector assembly 316, which is disposed between the input of fiber 314 and an optical detector 318. In one embodiment, reflector assembly 316 includes a filter 320 (e.g., a dielectric filter) and a mirror 322.

Reflector assembly functions to: (1) separate $\lambda_{RF}$ and $\lambda_{PH}$; (2) allow $\lambda_{RF}$ to travel to the optical detector 318, (3) send $\lambda_{PH}$ to an optical mirror 322, and (4) direct the mirror-reflected $\lambda_{PH}$ (called $\lambda_{PR}$) so that the mirror reflected light ($\lambda_{PR}$) propagates backwards towards the circulator 312. The circulator 312 sends $\lambda_{PR}$ to an optical detector 324, which outputs the "reflected" monitoring RF modulation called $f_{PR}$. Note that $f_{PR}$ has the same frequency as $f_{PH}$ but its phase is shifted proportionally to twice the fiber-induced phase shift. The two phase-monitoring signals, i.e., the forward and reflected versions, may then be multiplied via the mixer 306. The mixer's output may be passed through a low pass filter 308.

The filter's output is a DC signal, the value of which is directly proportional to twice the overall phase shift. This DC output contains all the phase information needed to correct the link phase/length changes vs temperature; it can be digitized and compared to a lookup table to be used by remoting signal generator to compensate for the phase shifting introduced by fiber 314.

In one embodiment, the "monitoring" frequency ($f_{PH}$) is selected such that its wavelength is greater or equal to four times (4×) a desired resolution. The reason for the first 2× factor is because the phase change (or delay) is twice the actual phase change (one delay length out and one delay length on the reflected path). The second 2× factor is because only 180° of the signal period can be used. If the signals are in phase there is 0° of phase shift and the DC value is maximum. If they are 180° out of phase, there is 180° of relative phase shift and the DC value is minimum. For any value over 180° of delay the DC value will be approaching the maximum again, thus creating an ambiguity. As an example, consider a temperature range of −100° C. to 100° C. and a fiber length (e.g., brown, FIG. 1) of 100 m with a delay slope of: 0.0325 ps/m−° C. Using the equation: deltaL-fiber=(delay slope)(100 m)(200 C)(effective speed of light), we find that the change in fiber length (deltaL-fiber) is equal to 0.133 m for a fiber with an index of refraction of 1.4682. The frequency required to cover that range would have an RF wavelength 4× or 0.532 m. By taking into account the speed of light through a fiber divided by the wavelength, the input frequency, $f_{PH}$, is found to be 354 MHz.

Embodiments of the invention can be used for any microwave/digital photonic link and is independent of the actual RF remoting frequency.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the process described above and illustrated in the drawings is shown as a sequence of steps, this was done solely for the sake of illustration. Accordingly, it is contemplated that some steps may be added, some steps may be omitted, the order of the steps may be re-arranged, and some steps may be performed simultaneously.

What is claimed is:

1. A method for measuring phase shift in an optical fiber, comprising:
    calculating a maximum expected change in the optical fiber length for a given set of conditions;
    producing a monitoring signal with a wavelength greater or equal to four times the maximum expected change in the optical fiber length;
    using the monitoring signal to modulate a light source, thereby producing modulated monitoring light that carries the monitoring signal;
    feeding the modulated monitoring light into an optical fiber, wherein the monitoring light, after entering the optical fiber, travels through the fiber a distance;
    after the modulated monitoring light travels the distance through the optical fiber, causing the modulated monitoring light to travel back through the fiber towards the point at which the monitoring light entered the optical fiber;
    after causing the modulated monitoring light to travel back through the optical fiber, receiving the modulated monitoring light and producing a phase-shifted monitoring signal based on the received modulated monitoring light; and
    processing the monitoring signal and the phase-shifted monitoring signal to produce a value corresponding to an amount of phase shift.

2. The method of claim 1, feeding a second modulated light into the optical fiber at the same or substantially same point at which the modulated monitoring light was fed into the optical fiber, wherein the wavelength of the second modulated light is different than the wavelength of the modulated monitoring light.

3. The method of claim 2, wherein the step of causing the modulated monitoring light to travel back through the fiber towards the point at which the light entered the optical fiber comprises using a reflector apparatus to reflect the modulated monitoring light.

4. The method of claim 3, wherein the reflector apparatus includes a filter and a reflector, the filter being configured to (1) deflect the modulated monitoring light towards the reflector and (2) pass the second modulated light towards a detector, and the reflector being configured to reflect the modulated monitoring light, wherein, after being reflected, the modulated monitoring light travels back through the fiber towards the point at which the monitoring light entered the optical fiber.

5. The method of claim 4, wherein the filter comprises a dielectric filter.

6. The method of claim 2, further comprising using a multiplexer to multiplex the modulated monitoring light and second modulated light prior to feeding said light into the optical fiber.

7. The method of claim 6, wherein the multiplexer is a wave division multiplexer.

8. The method of claim 7, wherein a circulator is disposed between the multiplexer and the optical fiber.

9. The method of claim 1, wherein the step of producing a phase-shifted monitoring signal based on the received modulated monitoring light comprises receiving the light at an optical detector and using the optical detector to produce the phase-shifted monitoring signal.

10. The method of claim 1, wherein the step of processing the monitoring signal and the phase-shifted monitoring signal comprises providing the phase-shifted monitoring signal and the monitoring signal to a mixer and filtering the output of the mixer to produce a signal, which signal is proportional to the phase shift caused by changes in the length of the optical fiber.

11. The method of claim 10, wherein the signal is a DC signal.

12. A system, comprising:
a first signal generator for producing a remoting signal;
a second signal generator for producing a monitoring signal;
a first light source coupled to the remoting signal generator for producing remoting light that carries the remoting signal;
a second light source coupled to the monitoring signal generator for producing monitoring light that carries the monitoring signal; and
an optical fiber for transmitting the remoting and monitoring light to a reflector apparatus, said reflector apparatus being configured to cause the monitoring light to travel back through the optical fiber towards the point at which the monitoring signal entered the optical fiber and being configured to allow the first light to travel to an optical detector;
wherein the monitoring signal is produced with a wavelength greater or equal to four times a maximum expected change in the optical fiber length calculated for a given set of conditions.

13. The system of claim 12, further comprising a multiplexer for receiving the remoting light and the monitoring light before they enter the optical fiber and for outputting multiplexed light comprising the remoting light and the monitoring light.

14. The system of claim 13, further comprising a circulator configured to receive the multiplexed light and to feed the multiplexed light into the optical fiber.

15. The system of claim 12, further comprising a splitter for receiving the monitoring signal and splitting the monitoring signal into a first channel and a second channel, wherein the first channel modulates the second light source, thereby causing the second light source to produce the monitoring light.

16. The system of claim 15, further comprising a mixer for receiving the second channel, receiving a phase-shifted monitoring signal, and multiplying the second channel with the phase-shifted monitoring signal to produce an output signal.

17. The system of claim 16, further comprising an optical detector for receiving the monitoring light after it travels back through the optical fiber and producing the phase-shifted monitoring signal.

18. The system of claim 16, further comprising a filter for producing a DC signal based on the output signal, wherein the level of the DC signal corresponds to an amount of phase shift cased by the optical fiber.

* * * * *